United States Patent [19]

St. Charles et al.

[11] Patent Number: 5,094,253
[45] Date of Patent: Mar. 10, 1992

[54] DYE FOR COLORING CIGARETTE PAPER

[75] Inventors: Frank K. St. Charles, Fisherville; John H. Lauterbach, Louisville; Li-Chung Chao, Louisville; Jiunn-Yann Tang, Louisville; Baran B. Chakraborty, Louisville; Andrew McMurtrie, Louisville, all of Ky.

[73] Assignee: Brown & Williamson Tobacco Corporation, Louisville, Ky.

[21] Appl. No.: 461,152

[22] Filed: Jan. 5, 1990

[51] Int. Cl.⁵ ............................................. A24B 1/02
[52] U.S. Cl. ................................................... 131/365
[58] Field of Search ..................................... 131/365

[56] References Cited

U.S. PATENT DOCUMENTS 4,146,041 3/1979 Laszlo .................... 131/365

Primary Examiner—V. Millin
Attorney, Agent, or Firm—Charles G. Lamb

[57] ABSTRACT

A dye for coloring cigarette paper a brown color which includes caramel as the brown coloring agent, a plasticizer to prevent the paper from becoming brittle, and water. The dye can further include carmine as a red coloring agent to change the shade and hue of the brown color of the caramel. The dye can further include a burn additive to promote the burning of the dyed paper if needed.

32 Claims, 2 Drawing Sheets

DYE FOR COLORING CIGARETTE PAPER

BACKGROUND OF THE INVENTION

1. Field of the Invention

The present invention relates to dyes, and more particularly to a dye for coloring cigarette paper a brown color using caramel as the brown coloring agent.

2. Description of the Prior Art

It is known to color cigarette wrapper paper with synthetic dyes. However, acceptable commercially available papers usually incorporate synthetic materials which in many instances are unacceptable for taste or other reasons.

It is an object of the present invention to provide a dye using natural materials as opposed to synthetic materials as the coloring agent. It is another object of the present invention to provide a dye using natural materials which have chromophores as an intensity closely approximating chromophores of synthetic dyes. It is even another object of the present invention to provide a dye using natural materials as the coloring agent which does not make the cigarette paper brittle.

SUMMARY OF THE PRESENT INVENTION

The present invention provides a dye for coloring cigarette wrapper paper a rich brown color comprising caramel as the brown coloring agent, a plasticizer to prevent the paper from becoming brittle, and water.

One advantageous embodiment of the dye of the present invention comprises from about 3 to about 20 weight percent caramel, from about 2 to about 8 weight percent glycerine, and from about 72 to about 95 weight percent water.

Another advantageous embodiment of the dye of the present invention comprises from about 3 to about 20 weight percent purified caramel, from about 1.0 to about 10 weight percent 2X carmine solution, from about 2 to about 8 weight percent glycerine, and from about 62 to about 94 weight percent water.

Yet another advantageous embodiment of the dye of the present invention comprises from about 3 to about 20 weight percent caramel, from about 1.0 to about 10 weight percent 2X carmine solution, from about 2 to about 8 weight percent glycerine, from about 3 to about 9 weight percent potassium citrate, and from about 53 to about 91 weight percent water.

BRIEF DESCRIPTION OF THE DRAWINGS

A better understanding of the present invention will be had upon reference to the following discussion in conjunction with the accompanying drawings wherein.

DETAILED DESCRIPTION OF THE PREFERRED EMBODIMENT

Figure 1:
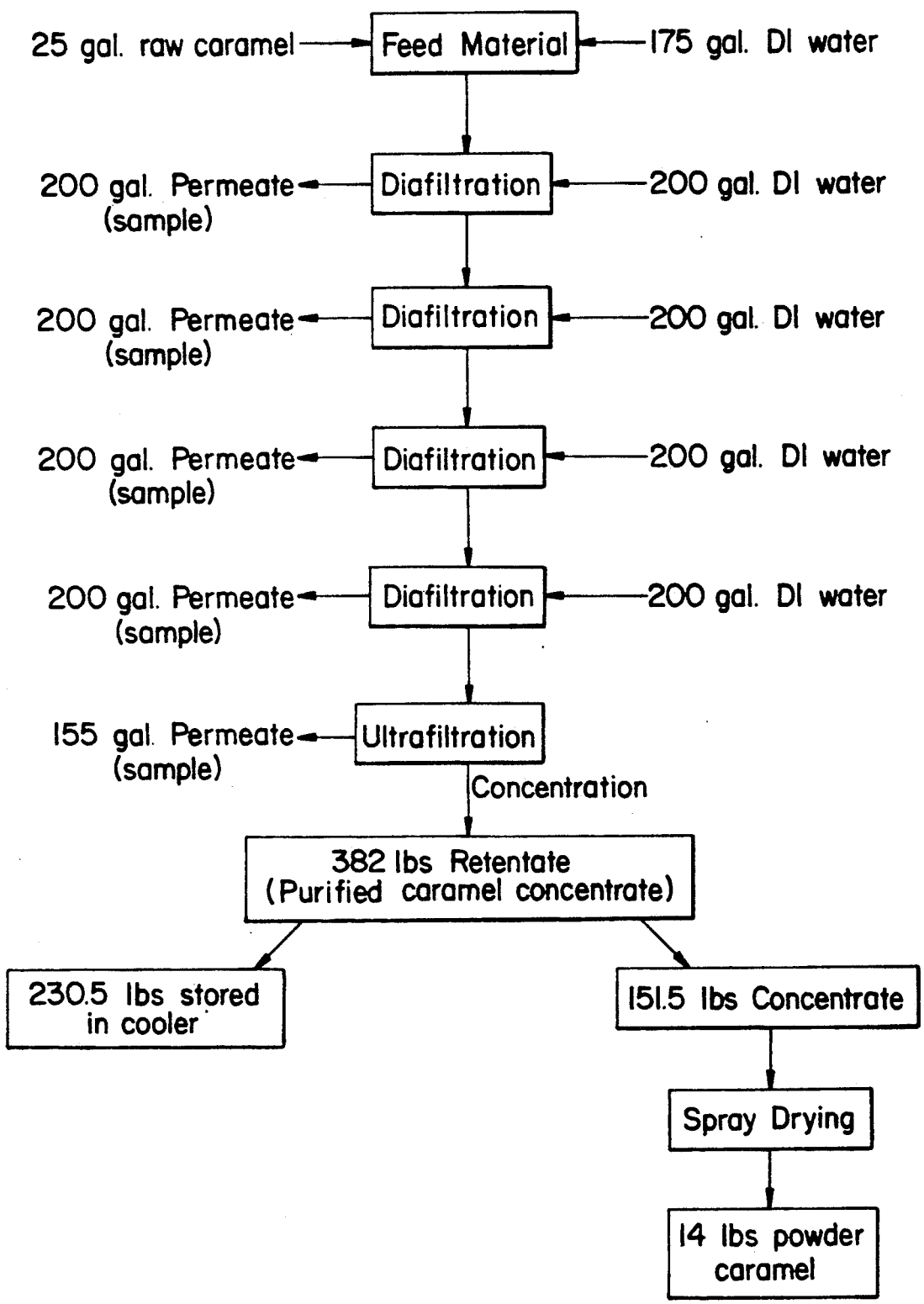
FIG. 1 is a flow diagram of one process used to purify caramel extract.

Cigarettes have a tobacco column circumferentially circumscribed by a paper wrapper. The present invention provides a dye for coloring the cigarette wrapper paper a brown color comprising caramel as the coloring agent, a plasticizer to prevent the paper from becoming brittle when the dye has dried, and water. The present invention further provides a filter cigarette product utilizing the caramel colored cigarette wrapper.

Caramel is defined by 21 Code of Federal Regulations, section 73.85 (Apr. 1, 1988) as follows:

(a) Identity: (1) The color additive caramel is the dark-brown liquid or solid material resulting from the carefully controlled heat treatment of the following food-grade carbohydrates: Dextrose, Invert sugar, Lactose, Malt sirup (sic), Molasses, Starch hydrolysates and fractions thereof, and Sucrose.

(2) The food-grade acids, alkalis, and salts listed in this subparagraph may be employed to assist caramelization, in amounts consistent with good manufacturing practice.

(i) Acids: Acetic acid, Citric acid, Phosphoric acid, Sulfuric acid, Sulfurous acid, (ii) Alkalis: Ammonium hydroxide, Calcium hydroxide U.S.P., Potassium hydroxide, Sodium hydroxide. (iii) Salts: Ammonium, sodium, or potassium carbonate, bicarbonate, phosphate (including dibasic phosphate and monobasic phosphate), sulfate, and sulphite.

(3) Polyglycerol esters of fatty acids, identified in § 172.854 of this chapter, may be used as antifoaming agents in amounts not greater than that required to produce the intended effect.

(4) Color additive mixtures for food use made with caramel may contain only diluents (sic) that are suitable and that are listed in this subpart as safe in color additive mixtures for coloring foods.

(b) Specifications. Caramel shall conform to the following specifications: Lead (Pb), not more than 10 parts per million; Arsenic (As), not more than 3 parts per million; and, Mercury (Hg), not more than 0.1 part per million.

Perferably, the caramel used as the brown color agent in the dye has been purified to remove most of the compounds in the caramel which will pass through a dialysis membrane having a molecular weight cut-off range of from about 2,000 to 30,000. This can be readily accomplished by the diafiltration method or alternatively by triturating the caramel with ethyl alcohol and water. Further, one-tenth percent solution of the purified caramel powder used in the dye of the present invention has an absorbance in a 1 cm cell of from about 1.20 to about 1.50 at 610 nanometers.

Three samples of caramel color extract were processed to provide a purified caramel. The following examples discuss processes of each of these three samples.

EXAMPLE I

110 Grams of caramel concentrate (55.5% solids) was diluted with deionized water at 6/1 ratio (v:v, water:-caramel). The diluted solution was then diafiltered through the membrane with five washes of 700 ml water. The permeate and retentate were collected, and solid content and color intensity were determined. Results are summarized in Table 1 below.

Two types of hollow fiber membranes with molecular weight cut-offs of 2,000 and 30,000 were used. Results showed that there were no significant differences in color retention and solid removal (three-fourths of the original solids) between these two membranes. Therefore, it is recommended that the membrane with the 30,000 molecular weight cut-off be selected since flow through the membrane increases with molecular weight cut-off.

TABLE 1

| Fraction # of Permeate (Vol. ml) | Solid Wt (g)* | % of Total Solids Removed |
| --- | --- | --- |
| I | 500 | 17.1 | 47.1 |
| II | 500 | 9.7 | 26.7 |
| III | 500 | 4.9 | 13.5 |
| IV | 500 | 2.6 | 7.1 |
| V | 500 | 1.2 | 3.3 |
| VI | 400 | 0.39 | 1.1 |
| VII | 456 | 0.44 | 1.2 |

*Per 100 g of concentrate

The results (Table 1) indicate that approximately 95% of the low molecular weight solids were removed after four 500 ml washes.

200 gram and 300 gram batches with dilution factor of 4/1 and 3.3/1, respectively, were tried and purification efficiencies were as good as that for the 100 gram batch.

EXAMPLE II

FIG. 1 is a flow chart illustrating the following described process.

Twenty-five gallons of caramel color extract was prefiltered, diluted and ultrafiltered by using hollow fiber membranes with a 10,000 molecular weight cut-off.

The caramel color extract was filtered through a 20 micron prefilter to remove particulate matter that could plug the membranes during ultrafiltration. The resulting caramel color mixture was diluted with 175 gallons of deionized water and ultrafiltered at 104° F. and 25-30 psi pressure. A four step diafiltration technique was utilized, and during each step 200 gallons of permeate was removed and 200 gallons of deionized water was added for constant volume filtration. The diafiltered mixture from the fourth step was then concentrated by ultrafiltration to provide 382 pounds of retentate solution. Finally, 151.5 pounds of the concentrate was spray dried in a Niro spray dryer with an inlet temperature of 400° F. and an outlet temperature of 200° F. providing 14 pounds of purified caramel powder.

The caramel color extract, each of the 200 gallons permeates, the 155 gallon permeate from the ultrafiltration concentration step, and the purified concentrate were analyzed for tinctorial power, soluble solid content, and specific gravity. The results are summarized in Table 2 below.

TABLE 2

| Test Samples | Total Vol (g) | Sp. Gravity | % Solid | Total Solid (Lbs) | Relative Color Distribution |
| --- | --- | --- | --- | --- | --- |
| Raw caramel | 25.0 | 1.260 | 55.00 | 144.38 | 6900 |
| Purified Conc. (Retentate) | 44.6 | 1.030 | 8.98 | 34.30 | 6422 |
| 1st Composite Permeate | 200.0 | 1.013 | 3.99 | 67.23 | 418 |
| 2nd Composite Permeate | 200.0 | 1.000 | 1.33 | 22.11 | 134 |
| 3rd Composite Permeate | 200.0 | 1.000 | 0.43 | 7.15 | 39 |
| 4th Composite Permeate | 200.0 | 1.000 | 0.13 | 2.16 | 20 |
| Permeate from Concentration | 155.0 | 1.000 | 0.22 | 2.84 | 213 |

With reference to Table 2 above, it was determined that since about 98% of the removable solids were collected in the first three fractions of the permeate that it would be feasible to reduce the number of ultrafiltration steps from four to three.

EXAMPLE III

Figure 2:
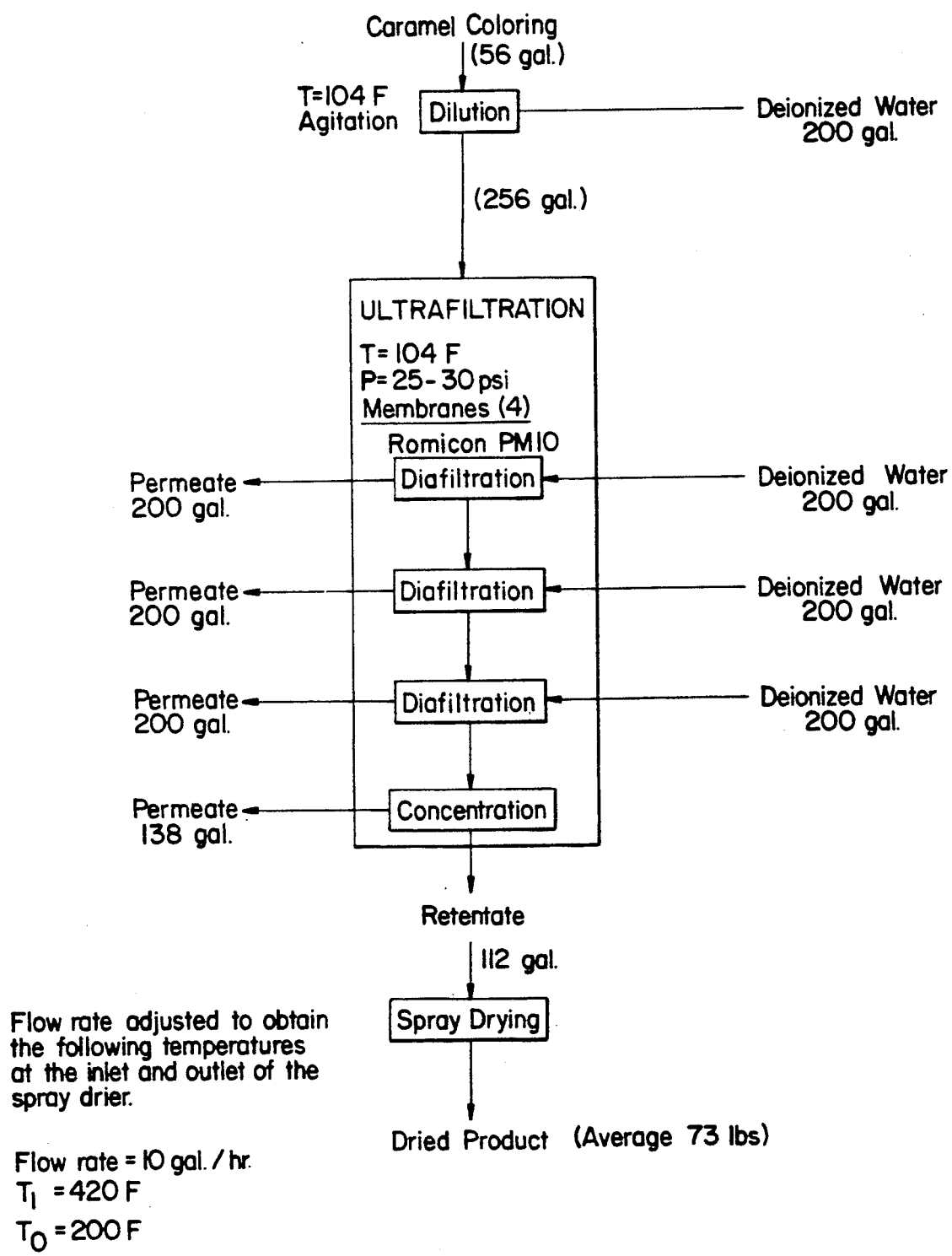
FIG. 2 is a flow diagram of a modified process used to purify caramel extract.

FIG. 2 is a flow chart illustrating the following described process.

Fifty six gallons of caramel color extract was prefiltered, diluted, and ultrafiltered by using Romicon PM10 hollow fiber membrane cartridges (10,000 molecular weight cut-off range).

The caramel extract was filtered through a 20 micron prefilter to remove any particulate matter that could plug the membranes during the following ultrafiltration. The resulting caramel color mixture was diluted with 200 gallons of deionized water and ultrafiltered at 104° F. and 25-30 psi pressure. A three step diafiltration technique was utilized, and during each step 200 gallons of permeate was removed as 200 gallons of deionized water was added for constant volume filtration. Three successive diafiltration steps were performed. The final diafiltrated mixture was concentrated to 112 gallons and was spray dried as in Example II to provide 73 pounds of purified caramel powder.

Caramel colorants are characterized by their tinctorial power and color hue index. These are obtained by measuring the color absorbance at 610 nm and 510 nm through a 1 cm cell. The absorbance of all purified caramel samples obtained from Examples I, II, and III were determined. The results (Table 3) show that a homogeneous purified caramel with good color quality was produced from the process of each example.

TABLE 3

| Color Hue-Index of Various Purified Caramel Samples | | | |
| --- | --- | --- | --- |
| Purified Caramel Samples | Absorbance of 0.1% W/V | | Color Hue Index* |
| | 610 nm | 510 nm | |
| From Example III, (FIG. 2) | | | |
| Composite #1 | 1.480 | 3.640 | 3.91 |
| Composite #2 | 1.476 | 3.634 | 3.91 |
| Composite #3 | 1.466 | 3.610 | 3.91 |
| From Example II, (FIG. 1) | 1.470 | 3.548 | 3.83 |
| From Example I, (30,000 MW cut-off) | 1.372 | 3.430 | 3.98 |
| From Example I, (2,000 MW cut-off) | 1.442 | — | — |

*Color hue index (1/microns) = log $(A_{510}/A_{610})/(0.61$ u$-0.51$ u$)$

A preferred plasticizer used in the dye is glycerine. However, other plasticizers such as, for example, propylene glycol, polyethylene glycol, triethylene glycol, and the like can be used.

A red coloring agent, preferably carmine, or a water based solution of carmine can also be incorporated in the dye to change the shade and hue of the brown color of the caramel. Carmine is made from the scale insect Coccus cati L., Homoptera, commonly known as cochineal. A suitable water based carmine solution is marketed by Crompton and Knowles Corp., 1595 MacArthur Blvd., Mahwah, N. J., under the trademark "CARMISOL". For example, a 2X carmine solution was used in the dye which is a solution of carmine containing 7% active carmine.

EXAMPLE IV

Four carmine samples were obtained from Crompton & Knowles Corporation (C&K) for evaluation. The color strength of these samples was determined by measuring the absorbance at 528 nm using 0.01% W/V solution as compared to a sample of freeze dried beet extract. Results are summarized as follows:

TABLE 4

| Sample Red Dye | Absorbance at 528 nm (0.01% W/V) |
|---|---|
| 1. L-2665 carmine powder | 1.0899 |
| 2. 50-272010-00 carmine solution | 0.4570 |
| 3. 50-272015-00 carmine solution | 0.7465 |
| 4. 50-272020-00 carmine solution | 0.4700 |
| Beet Extract (freeze-dried) | 0.0325 |

Based on the absorbance, carmine powder (L-2665) was found to be the best among the samples tested.

During the development of brown dye formulation using the purified caramel and carmine powder, small carmine particles were found suspended in the dye solution which caused speck problems on the paper. It was suspected that the pH of the ink solution may be one of the crucial factors in obtaining a homogeneous solution. Test results indicated that the speck problem could be alleviated by adjusting the pH of ink solution from 5.7 to 8.6. In addition to 7% active red dye, the preferred carmine solution (referred to as carmine 2X) contains glycerine and KOH.

In addition, typical cigarette wrapper paper includes a filler which is basic, such as calcium carbonate. Therefore, the dye can also include a pH adjusting agent to adjust the pH of the dye to from about 5.0 to about 10.5, and preferably about 8.6. One such pH adjuster which works well in the dye of the present invention is potassium hydroxide. However, other basic salts and hydroxides may also be used.

Depending upon the cigarette burn rate desired, a burn rate enhancer or burn additive may have to be included in the dye. One appropriate burn additive is potassium citrate. However, other burn rate additives known in the art may also be used, such as, for example sodium and potassium salts of carboxylic acids such as citric, acetic, tartanic, malic, propionic, caprylic, etc; ammonium phosphate; carbonates; and the like.

The foregoing detailed description is given primarily for clearness of understanding and no unnecessary limitations should be understood therefrom for modifications will become known to those skilled in the art upon reading this disclosure and may be made without departing from the spirit of the invention or scope of the appended claims.

What is claimed is:

1. A dye for coloring cigarette wrapper paper comprising:
   purified caramel;
   a plasticizer to prevent the paper from becoming brittle; and,
   water.

2. The dye of claim 1, further comprising carmine.

3. The dye of claim 1, further comprising a burn additive.

4. The dye of claim 3, wherein the burn additive comprises potassium citrate.

5. The dye of claim 1, wherein the plasticizer comprises glycerine.

6. The dye of claim 1, further comprising a pH adjusting additive to adjust the pH of the dye to between about 5.0 and about 10.5.

7. The dye of claim 1, wherein the pH additive comprises potassium hydroxide.

8. The dye of claim 1, wherein the caramel was purified by diafiltration and is the resulting retentate.

9. The dye of claim 8, wherein the resulting caramel retentate comprises no more than 30% of the mass of the unpurified caramel.

10. The dye of claim 8, wherein the caramel retentate is the material retained when passing untreated caramel through a membrane designated to have a molecular weight cut-off of from 2000 to 30,000.

11. The dye of claim 8, wherein a 0.1% solution of the purified caramel has an absorbance of from about 1.20 to 1.50 at 610 nanometers using a 1 cm cell.

12. The dye of claim 1, wherein the caramel is purified by triturating the caramel with ethyl alcohol and water.

13. The dye of claim 2, wherein the carmine solution comprises from about 1.0% to 10% by weight of the dye.

14. A dye for coloring cigarette wrapper paper comprising:
   from about 3 weight percent to about 20 weight percent purified caramel;
   from about 2 weight percent to about 8 weight percent glycerine; and,
   from about 72 weight percent to about 95 weight percent water.

15. The dye of claim 14, further comprising:
   from about 1.0 weight percent to about 10.0 weight percent carmine solution.

16. The dye of claim 14, further comprising:
   from about 3 weight percent to about 9 weight percent potassium citrate.

17. The dye of claim 14, further comprising a pH adjusting additive to provide a pH of from about 5.0 to about 10.5.

18. A process for purifying caramel color comprising the steps of:
   prefiltering the caramel color extract to remove particulate matter above a predetermined size;
   diluting the resulting prefiltered extract;
   as permeate is removed by the diafiltering step, adding a volume of deionized water to the diafiltering step equal to the volume of permeate removed to provide a resulting retentate; and,
   spray drying the resulting retentate to provide a purified caramel powder product.

19. A filter cigarette product comprising:
   a filter attached to one end of a tobacco rod, said tobacco rod circumscribed by a paper wrapper having a dye therein purified comprising caramel, a plasticizer to prevent the wrapper from becoming brittle, and water.

20. The product of claim 19, said dye further comprising carmine.

21. The product of claim 19, said dye further comprising a burn additive.

22. The product of claim 21, wherein the burn additive comprises potassium citrate.

23. The product of claim 19, wherein the plasticizer comprises glycerine.

24. The product of claim 19, said dye further comprising a pH adjusting additive to adjust the pH of the dye to between about 5.0 and about 10.5.

25. The product of claim 24, wherein the pH additive comprises potassium hydroxide.

26. The product of claim 19, wherein the caramel comprises purified caramel.

27. The product of claim 19, wherein the caramel was purified by diafiltration and is the resulting retentate.

28. The product of claim 27, wherein the resulting caramel retentate comprises no more than 30% of the mass of the unpurified caramel.

29. The product of claim 27, wherein the caramel retentate is the material retained when passing untreated caramel through a membrane designated to have a molecular weight cut-off of from 2000 to 30,000.

30. The product of claim 27, wherein a 0.1% solution of the purified caramel has an absorbance of from about 1.20 to 1.50 at 610 nanometers using a 1 cm cell.

31. The product of claim 19, wherein the caramel is purified by triturating the caramel with ethyl alcohol and water.

32. The product of claim 20, wherein the carmine solution comprises from about 1.0% to 10% by weight of the dye.

* * * * *

UNITED STATES PATENT AND TRADEMARK OFFICE
CERTIFICATE OF CORRECTION

PATENT NO. : 5,094,253
DATED : March 10, 1992
INVENTOR(S) : St. Charles, et al It is certified that error appears in the above-identified patent and that said Letters Patent is hereby corrected as shown below:

```
Column 6, line 37, after "color" insert --for use as a dye for coloring
                   cigarette wrapper paper--
          line 42, before "as" insert --subjecting the prefiltered
                   extract to diafiltration, and --
          line 51, delete "purified" before "comprising" and reinsert
                   --purified-- after "comprision"; and,
          Cancel Claim 26.
```

Signed and Sealed this

Tenth Day of August, 1993

Attest:

MICHAEL K. KIRK

*Attesting Officer*   Acting Commissioner of Patents and Trademarks